(12) United States Patent
Gayrard et al.

(10) Patent No.: US 7,200,334 B2
(45) Date of Patent: Apr. 3, 2007

(54) SYSTEM FOR TRANSMITTING DIGITAL SIGNALS IN A SPACE VEHICLE

(75) Inventors: Jean-Didier Gayrard, Toulouse (FR); Michel Sotom, Toulouse (FR); Michel Maignan, Pins Justaret (FR)

(73) Assignee: Alcatel, Paris (FR)

( * ) Notice: Subject to any disclaimer, the term of this patent is extended or adjusted under 35 U.S.C. 154(b) by 594 days.

(21) Appl. No.: 10/303,746

(22) Filed: Nov. 26, 2002

(65) Prior Publication Data

US 2003/0113121 A1 Jun. 19, 2003

(30) Foreign Application Priority Data

Nov. 27, 2001 (FR) .................................. 01 15301

(51) Int. Cl.
*H04B 10/00* (2006.01)

(52) U.S. Cl. .................. 398/118; 398/119; 398/120; 398/121; 398/123; 398/124; 398/127; 398/128; 398/129; 398/130; 398/131; 398/135; 398/138; 398/139; 398/141; 398/72; 398/79; 398/167.5; 398/164; 398/82; 398/85

(58) Field of Classification Search ........... 398/118, 398/119, 120, 121, 123, 124, 127, 128, 129, 398/130, 131, 135, 136, 138, 139, 141, 164, 398/167.5, 165, 72, 79, 70, 71, 82, 85, 115, 398/116, 117
See application file for complete search history.

(56) References Cited

U.S. PATENT DOCUMENTS

| 4,975,926 | A | 12/1990 | Knapp | |
|---|---|---|---|---|
| 6,252,691 | B1* | 6/2001 | Porzucki et al. | 398/121 |
| 6,414,774 | B1* | 7/2002 | Scifres | 398/129 |
| 6,426,819 | B1* | 7/2002 | Crimmins et al. | 398/99 |
| 6,792,212 | B1* | 9/2004 | Lloyd et al. | 398/124 |
| 6,944,403 | B2* | 9/2005 | Margalit et al. | 398/129 |
| 2003/0035169 | A1* | 2/2003 | Byers et al. | 359/124 |

FOREIGN PATENT DOCUMENTS

| EP | 0 194 915 A1 | 9/1986 |
|---|---|---|
| EP | 1 225 713 A1 | 7/2002 |
| FR | 2 696 890 A1 | 4/1994 |

* cited by examiner

*Primary Examiner*—Hanh Phan
(74) *Attorney, Agent, or Firm*—Sughrue Mion, PLLC

(57) ABSTRACT

The invention relates to a system for conveying digital signals inside a space vehicle between a transmitter and a receiver. In the invention, the link between the transmitter and the receiver comprises a first portion made of optical fiber and a second portion in which infrared radiation propagates without guidance. A particular application lies in conveying remote control and telemetry signals within a satellite between a control module and a piece of equipment.

13 Claims, 2 Drawing Sheets

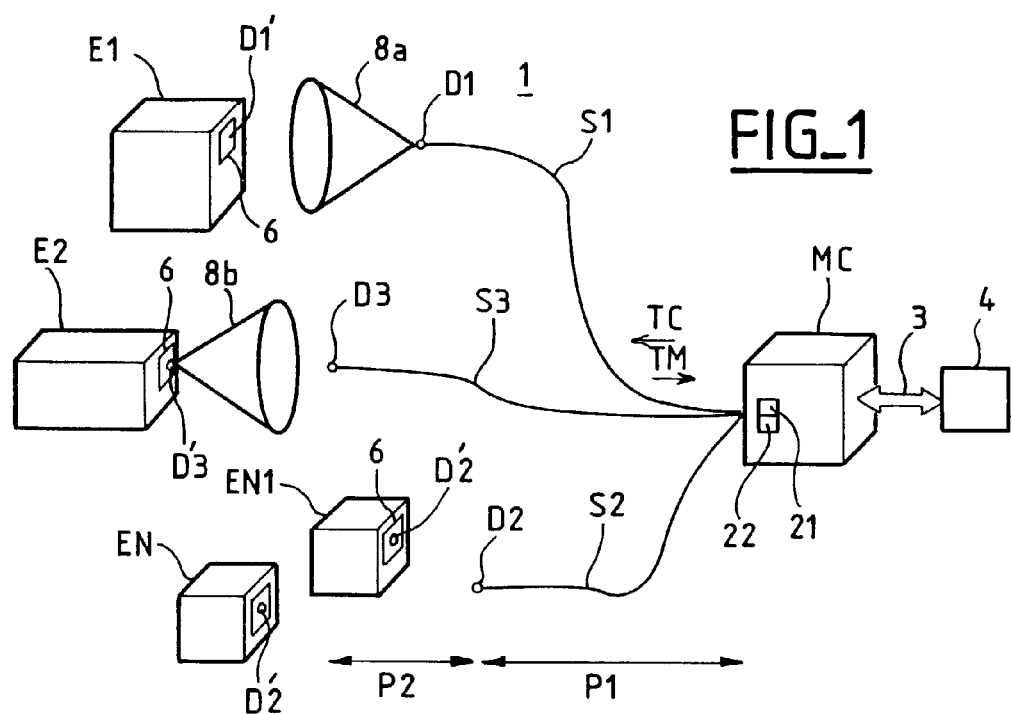
FIG_1
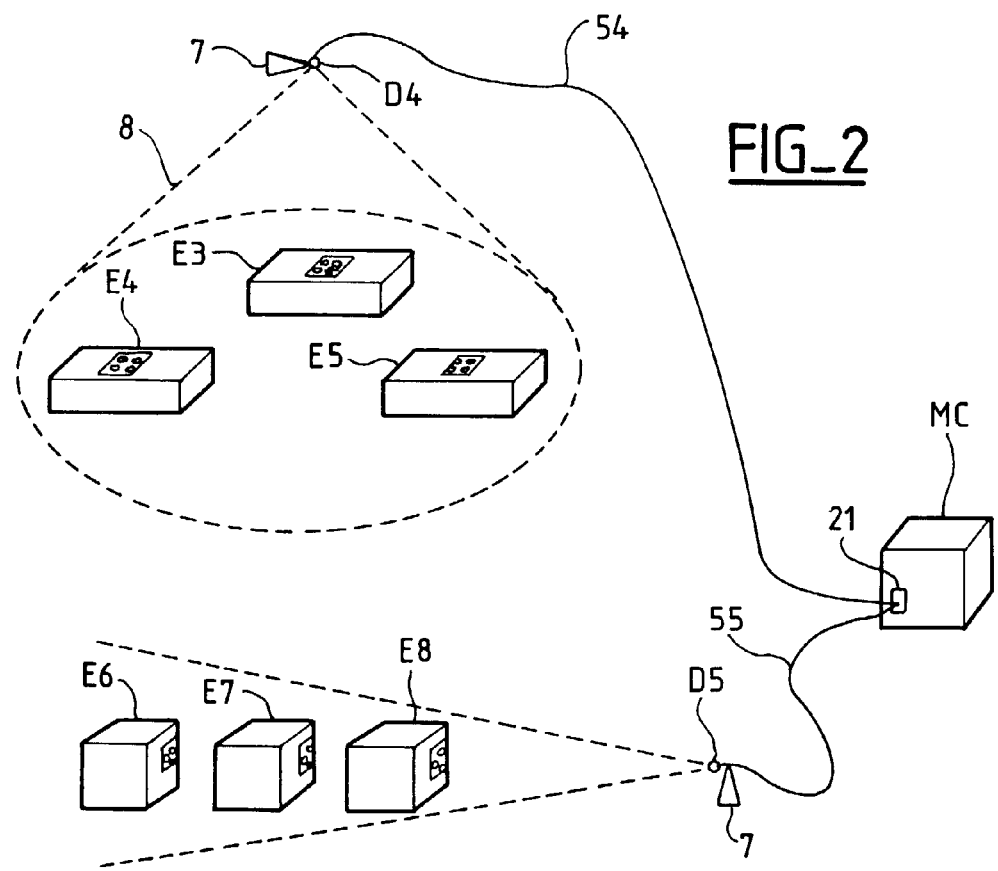
FIG_2

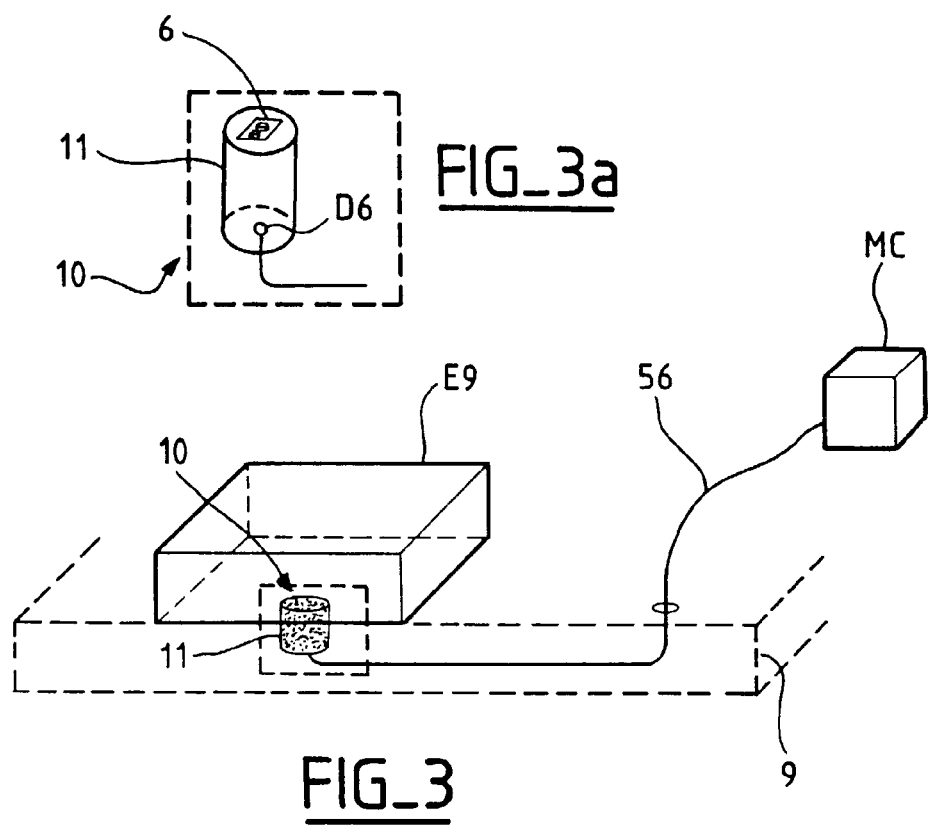

SYSTEM FOR TRANSMITTING DIGITAL SIGNALS IN A SPACE VEHICLE

The present invention relates to the field of signal transmission systems in space vehicles.

More particularly, the invention relates to a system for transmitting digital signals within a space vehicle, in particular telemetry and/or remote control signals.

BACKGROUND OF THE INVENTION

A space vehicle such as a satellite carries numerous pieces of electronic equipment such as amplifiers, receivers, computers, . . . . These pieces of equipment are often provided redundantly for reasons of reliability, and they can belong for example to a satellite relay system for television or telephone signals, or to systems for performing service functions on board the satellite (on-board management, attitude control, power supply, etc. . . . ).

When a satellite is launched, a nominal operating configuration is selected, i.e. certain pieces of equipment are selected to perform service functions, and a certain number of channels for transmitting telephone signals, and a certain number of channels for transmitting TV signals. During the lifetime of the satellite, and in particular for commercial reasons, it can happen that the configuration needs to be modified. In order to reconfigure the equipment to satisfy demand, ground control and monitoring stations send transmission control (TC) signals by radio which are received by a receiver on board the satellite, which then applies these signals both to a digital control unit (CU) constituted by a control terminal unit (CTU) which processes the signals, and to a plurality of remote terminal units (RTUs) for forwarding the signals to the various pieces of equipment. These TC signals can also be used to select among redundant pieces of equipment those pieces which are to be active, in particular in systems for performing service functions on board the satellite. The TC signals thus serve to control and manage the overall operation of the electronic equipment on board the satellite.

It is also always desirable to perform monitoring tests, either to verify that the TC signals have been properly executed, or to detect on the ground any breakdowns that might impede proper operation of the satellite or disturb the signals it relays. The various pieces of equipment on board the satellite therefore send telemetry (TM) signals to the central unit, which signals are then forwarded to the ground by appropriate transmitters located on board the satellite and in communication with the central unit. The TM signals can be transmitted either in response to TC signals, or else in systematic manner in order to monitor the state of the on-board equipment on a continuous basis.

The transmission of TM and TC signals between the central unit and the various pieces of on-board equipment is conventionally performed over wire links using cables; the set of wire links for carrying remote control and telemetry signals being referred to as the "TM-TC harness".

It is always of great importance when designing a satellite to reduce on-board mass to as small a value as possible in order to reduce the cost of launching the satellite and also the cost of fuel needed to maintain the satellite on station in orbit, or indeed to increase the length of time a satellite can be maintained on station in orbit for a given quantity of on-board fuel.

Unfortunately, the TM-TC harness represents considerable mass (several tens of kilograms). The wire links it provides are numerous since each one of them must be a both-way link between the piece of equipment in question and the central unit, in order to keep TM and TC signals separate from the signals relating to each of the pieces of equipment. Furthermore, the cost of such a harness is high because of the time taken to design the harness and the time required to test and verify each wire and to connect it. In addition, the cables used for making such links are usually shielded cables in order to avoid disturbances due to interfering electromagnetic radiation.

Conventional solutions for reducing harness mass and the number of links exist in two forms: there are wire buses for reducing the number of wires, and there are wireless links for omitting wires.

The principle of the bus is to combine the previously digitized TM/TC signals in a time-division multiplex and to carry them in series at a high rate (approximately 1 million bits per second (Mb/s)) over a wire bus. The few wires of the bus are connected to all of the various pieces of equipment in a "daisy chain". That solution does not eliminate the harness completely and it requires the interconnected pieces of equipment to operate at high bit rates. Problems of electromagnetic compatibility increase the amount of shielding needed and therefore increase the mass of the harness. Problems associated with breakdown propagation make redundancy schemes more complicated. Finally, the terminal modules at the end of the bus link in each piece of equipment are complex and greatly overdimensioned for the volume of TM/TC signals that normally required for ordinary pieces of microwave equipment (e.g. for a channel amplifier or a frequency converter).

The principle of wireless connections lies in using either radiowaves or infrared light (IR) for carrying signals by radiating them through free space.

Radiofrequency links make problems of electromagnetic compatibility considerably more complex (whether with the equipment itself, or with test benches, or with the satellite, or with the launcher, or with the launching pad). Characterizing a transmission channel is very difficult (it must be done inside a Faraday cage cluttered with masses of metal) and varies with the degree of integration of the satellite (flat panels, integrated communications module, satellite in its flight configuration).

When transmitting TM/TC signals using infrared light, one system using such a principle is described in French patent No. 2 696 890 filed by Alcatel Espace. In spite of their multiple advantages, infrared links present problems with shadow zones and they require transmitters and receivers to be optically visible to one another, which puts a constraint on how the satellite is arranged. In addition, the bit rates that can be used depend to a great extent on the geometry of the system, it being understood that this geometry varies depending on the degree of integration of the satellite.

OBJECT AND SUMMARY OF THE INVENTION

The object of the present invention is thus to obtain a system for conveying digital telemetry and/or remote control signals for a space vehicle that is capable of overcoming most of the visibility problems and connection budget problems that are characteristic of infrared links in a limited and cluttered space (inside the satellite) while nevertheless retaining its advantages.

To this end, the invention provides a system for transmitting digital signals in a space vehicle, the system comprising at least one transmitter, at least one receiver, and a transmission link between the transmitter and the receiver, wherein the link between said transmitter and receiver comprises a first portion defined by a guided mode of propagation suitable for conveying said digital signals converted into the form of guided infrared signals, and a second portion consecutive with the first portion and defined by a radiated mode of propagation in free space, together with junction means between the first and second portions for transferring the signals between the first and second portions.

As a result, the invention presents the advantage of providing an astute combination of the two propagation modes available for infrared light (guided mode and free space mode) while avoiding the drawbacks of each of those modes (connectors for guided mode, and shadow zones for free space mode), while also benefiting from the advantages of each mode (no shadow zones for guided mode, and no connectors for free space mode).

By means of the invention, a network of optical fibers can transport the digital signals from a transmitter, e.g. a TM/TC controller, to zones that are close to respective receivers such as pieces of equipment. At the end of the optical fibers, the infrared light propagates in free space towards receiver means that can be constituted by detectors mounted on the pieces of equipment. The absence of connectors on the pieces of equipment simplifies integration.

In an embodiment, the transmitter and/or the receiver comprises control means for transmitting remote control signals, and/or a piece of equipment capable of transmitting telemetry signals to the transmitter.

In an embodiment, said first portion of optical fiber is suitable for conveying infrared signals in both directions.

In an embodiment, the junction means between the first and second portions comprise transmission means for transmitting into free space the infrared signals conveyed over the first portion, said transmission means being suitable for radiating said infrared signals towards receiver means for receiving the radiated infrared signals at the receiver, and/or receiver means for receiving infrared signals carried in free space over the second portion, the latter receiver means being suitable for receiving said infrared signals from infrared signal transmitter means of the receiver.

In an embodiment, said transmitter and receiver means of the transmitter and of the receiver are suitable for functioning in both directions.

In an embodiment, said transmitter and receiver means of the transmitter and of the receiver comprise respectively an infrared diode and a photoreceiver.

In an embodiment, a single optical fiber is used to make the connection of said first portion.

In an embodiment, the communications protocol governing communication between said transmitter and receiver is a protocol of the master/slave type in which the transmitter is the master and the receiver is the slave.

In an embodiment, two different wavelengths are used over said first portion made of optical fiber, a first of the wavelengths being for transmitting infrared signals from the transmitter to the receiver, and the second wavelength being for transmitting infrared signals from the receiver to the transmitter.

In an embodiment, the system comprises means for adjusting the radiation and acceptance cones of said transmission and/or reception means forming the junction means, and/or the system comprises means for filtering interfering radiation.

In an embodiment, said transmission and/or reception means forming the junction means are arranged in such a manner as to illuminate a zone including a plurality of said receivers, and said reception and/or transmission means of the receivers are fitted to the respective receivers in such a manner as to be optically visible from said transmission and/or reception means forming the junction means.

In an embodiment, said transmission and/or reception means forming the junction means are arranged close to said reception and/or transmission means fitted to a receiver so as to illuminate said means alone.

In an embodiment, a guiding piece is inserted between the end of the optical fiber and the reception and/or transmission means fitted to the receiver.

In an embodiment, said guiding piece is contained in a support panel for supporting said receiver, and, over a determined length, the optical fiber runs along the panel or within it.

BRIEF DESCRIPTION OF THE DRAWINGS

The invention will be better understood on reading the following description and on examining the accompanying figures. These figures are given purely by way of non-limiting indication. In the figures:

FIG. 1 is a diagram of an embodiment of a system of the invention;

FIG. 2 is a diagram of a variant of the FIG. 1 system; and

FIGS. 3 and 3a are diagrams of a second variant of the FIG. 1 system.

MORE DETAILED DESCRIPTION

FIG. 1 shows a system for sending remote control signals TC to pieces of equipment E1, E2, E3, . . . , EN, and also for receiving telemetry signals issued by the pieces of equipment. The pieces of equipment E1 to EN are located on the inside walls of a satellite (not shown), in order to enable heat to be dumped into the space outside the satellite.

The system 1 comprises:
  a control module MC which manages communication to and from the pieces of equipment (format and protocol);
  a converter 21 for converting control signals TC into infrared form for sending to the pieces of equipment;
  a detector and a converter 22 for detecting telemetry signals TM issued by the pieces of equipment and converting them; and
  an interface 3 with a data management system 4 of the satellite, referred to as a digital control unit, or as an on-board computer. The on-board computer also provides the interface with the transmitters and receivers (not shown) in communication with ground stations.

The control module may be separate or it may be integrated in the on-board computer.

The function of the control module is to put the remote control signals TC into digital form (if they are not already in digital form), and then to encode them (the means performing these two functions being conventional so they are not shown), and finally to convert them into optical signals in the converter 21 so that they can be conveyed by optical fibers 51 and 52. The ends of the fibers 51 and 52 are fitted with optical devices D1, D2 for broadcasting the optical signals in the form of free space radiation towards corresponding photoreceivers D1', D2'. The photodetectors D1', D2' are located on faces of the receiving pieces of equipment EN-1, EN that are facing towards the corresponding ends of the fibers.

In their simplest possible form, these optical devices may be no more than suitably-shaped fiber ends (cut and polished). As explained below, these optical devices may alternatively be provided with geometrical optical systems that are more complex: lenses, prisms, collimators, plane or concave or convex mirrors, etc., in conventional manner.

Naturally, any optical device for receiving and/or transmitting free space radiation of infrared signals could be considered for use as the devices D1, D2.

The optical devices D1 to D3 then serve as junction interfaces between the two modes of transmission.

The photodetectors D1', D2' fitted to the pieces of equipment form parts of respective infrared modules 6 for converting the radiated infrared signals that they receive into electrical signals for subsequent processing.

One piece of equipment, such as the piece referenced E2, is also intended to supply the control module with telemetry information. Its infrared module 6 includes an infrared-emitting photodiode D3' together with its associated optics. The optical device D3 facing D3' and arranged at the end of the fiber 53 is suitable for operating in reception. FIG. 1 shows the radiation patterns 8a and 8b of the optical device D1 and of the module 6, by way of illustration. Arrows are also used to represent a first portion referenced P1 corresponding to that fraction of the connection between the control module and the pieces of equipment which is formed by optical fiber, and a second portion P2 which corresponds to connection by radiation in free space.

It should be observed that the module 6 also manages formats and protocol.

The system has all of the redundancy (duplication of connections between the control module and the pieces of equipment, etc.) needed to achieve a desired degree of reliability and the absence of any single breakdown point.

In a variant, a single fiber may be used for conveying infrared signals in both directions firstly from the control module and secondly from the pieces of equipment E1, . . . , EN. This requires a communications protocol to be defined that is based on the master/slave principle where only the master (the control module) can initiate communication and define priorities. The slaves (the pieces of equipment) send only in turn and at the request of the control module.

In addition, it is advantageous to use two different wavelengths on such a single fiber, with one of the wavelengths being reserved for the go direction (conveying remote control signals TC) and the other wavelength being reserved for the return direction (conveying telemetry signals TM). This additional characteristic of using two wavelengths makes it possible to achieve better isolation between the go signals and the return signals, and also makes it possible to implement different communications protocols.

It should be observed that the optical fiber harness may be of identical design for all satellites and payloads (i.e. it can be standardized). The optical harness may be passive (when it comprises passive fibers and optical couplers), or active (when light amplifiers are included in the portion P1).

As shown in the variant of FIG. 2, the end of the fiber 5 may be provided with an adjusting optical device 7 such as a lens, a mirror, or a prism, for example, thus enabling the radiation cone 8b and the acceptance cone 8a to be focused, modified, or steered, or indeed serving to filter out interfering radiation. The end of the fiber may also be shaped so as to modify or point the radiation/acceptance cone.

An important aspect of the invention is the size of the zone in which the infrared signals propagate through free space: this zone may be broad (azimuth or zenith illumination) or narrow (semi-guided illumination).

When broad or extended illumination is used, as shown in FIG. 2, the optical devices D4 and D5 of the fibers 54 and 55 illuminate respective broad zones, each containing a plurality of pieces of equipment E3 to E8.

For the pieces of equipment E3 to E5, that are illuminated by the device D4, this illumination is zenithal, i.e. the pieces of equipment are lighted from above and they carry their respective infrared modules 6 on their top faces; however the pieces of equipment E6 to E8 are subjected to azimuth illumination, i.e. it is their side faces which face towards the illumination cone of the diode D5.

FIGS. 3 and 3a show semi-guided illumination. A fiber 56 connects the control module M3 to an infrared transmitter/receiver optical device D6. In this embodiment, the end of the fiber constituting the device D6 illuminates the infrared module 6 of a single piece of equipment 59 at very close range. The end of the fiber terminates in a tube 11 (empty, transparent, or notional), with the module 6 of the equipment being located at the other end of the tube. The tube maybe a special insert, or a guide piece 11, with the piece of equipment E9 then being mounted on its support panel 9 together with the infrared module 6 on its assembly face and in alignment with the special insert. An example of this guide piece is shown on a larger scale in FIG. 3a.

The guidance piece is inserted in the panel 9 and the optical fiber can leave the panel so as to run along a predetermined length thereof to a control module, or as shown it may be integrated within the panel. The same principle of semi-guided illumination may be used for an infrared module mounted on one of the side faces of the piece of equipment.

Naturally, the ways in which illumination is achieved are not limited to those described.

Thus, the advantages of the invention are numerous. In particular, the invention makes the following possible:
  the mass and the number of connections in the harness can be reduced. Optical fiber is lighter in weight and more flexible than copper cables. A single fiber can be used for transmission in both directions (ignoring redundancy) and for all of the TM/TC signals;
  problems of electromagnetic compatibility and electrostatic discharge are eliminated;
  the length of time required for assembly, testing, and integration is reduced; and
  the harness and its routing can be standardized for buses (satellite platforms) in a given family (where a family is defined by a common chassis and shared physical characteristics).

In addition, the invention makes it possible to combine two different modes of propagation of infrared light signal in an astute manner over a single connection, i.e. both free space propagation and optical fiber propagation, and it achieves this without requiring active interface components between the two portions. This makes it possible to avoid most of the problems of visibility and connection budget associated with unguided infrared connections in a limited space that is cluttered (inside a satellite) while conserving the advantages thereof (no connectors and no problems of electromagnetic compatibility).

What is claimed is:

1. A system for transmitting digital signals in a space vehicle, the system comprising
  at least one transmitter,
  at least one receiver, and
  a transmission link between the transmitter and the receiver,
  wherein the link between said transmitter and receiver comprises a first portion defined by a guided mode of propagation suitable for conveying said digital signals converted into the form of guided infrared signals, and a second portion consecutive with the first portion and defined by a radiated mode of propagation in free space, together with junction means between the first and second portions for transferring the signals between the first and second portions, and wherein a communications protocol governing communication between said transmitter and receiver is a protocol of a master/slave type in which the transmitter is the master and the receiver is the slave.

2. A system according to claim 1, wherein the transmitter comprises control means for transmitting remote control signals, and the receiver comprises a piece of equipment capable of transmitting telemetry signals to the transmitter.

3. A system according to claim 1, wherein said first portion is suitable for conveying infrared signals in both directions.

4. A system according to claim 3, wherein two different wavelengths are used over said first portion, which is made of an optical fiber, a first wavelength for transmitting infrared signals from the transmitter to the receiver, and a second wavelength for transmitting infrared signals from the receiver to the transmitter.

5. A system according to claim 1, wherein the junction means between the first and second portions comprise at least one of transmission means for transmitting, into free spaces, the infrared signals conveyed over the first portion, said transmission means being suitable for radiating said infrared signals towards receiver means for receiving the radiated infrared signals at the receiver, and receiver means for receiving infrared signals carried in free space over the second portion, the latter receiver means being suitable for receiving said infrared signals from infrared signal transmitter means of the receiver.

6. A system according to claim 5, wherein the system comprises means for adjusting radiation and acceptance cones of at least one of said transmission and reception means forming the junction means, and wherein the system comprises means for filtering interfering radiation.

7. A system according to claim 5, wherein said transmission and reception means forming the junction means are arranged in such a manner as to illuminate a zone including a plurality of said receivers, and wherein said reception and transmission means of the receivers are fitted to the respective receivers in such a manner as to be optically visible from said transmission and reception means forming the junction means.

8. A system according to claim 1, wherein said transmitter and receiver means of the transmitter and of the receiver are suitable for functioning in both directions.

9. A system according to claim 1, wherein said transmitter and receiver means of the transmitter and of the receiver comprise respectively an infrared diode and a photoreceiver.

10. A system according to claim 1, wherein a single optical fiber is used to make the connection of said first portion.

11. A system according to claim 1, wherein said transmission and reception means forming the junction means are arranged close to said reception and transmission means fitted to a receiver so as to illuminate said reception and transmission means alone.

12. A system according to claim 11, wherein a guiding piece is inserted between the end of the optical fiber and the reception and/or transmission means fitted to the receiver.

13. A system according to claim 12, wherein said guiding piece is contained in a support panel for supporting said receiver, and wherein, over a determined length, the optical fiber runs along the panel or within it.

* * * * *